United States Patent [19]

Veldhuis et al.

[11] Patent Number: 5,146,457
[45] Date of Patent: Sep. 8, 1992

[54] DEVICE FOR TRANSMITTING DATA WORDS REPRESENTING A DIGITALIZED ANALOG SIGNAL AND DEVICE FOR RECEIVING THE TRANSMITTED DATA WORDS

[75] Inventors: Raymond N. J. Veldhuis; Gerrit J. Keesman, both of Eindhoven, Netherlands

[73] Assignee: U.S. Philips Corporation, New York, N.Y.

[21] Appl. No.: 794,319

[22] Filed: Nov. 14, 1991

Related U.S. Application Data

[63] Continuation of Ser. No. 327,197, Mar. 22, 1989, abandoned.

[30] Foreign Application Priority Data

Sep. 16, 1988 [NL] Netherlands ............... 8802291

[51] Int. Cl.⁵ .................... H04J 3/12; H04J 15/00
[52] U.S. Cl. ..................... 370/111; 370/118
[58] Field of Search ............ 370/110.1, 110.4, 111, 370/118

[56] References Cited

U.S. PATENT DOCUMENTS

| | | | |
|---|---|---|---|
| 4,079,203 | 3/1978 | Dragoo | 370/110.4 |
| 4,354,265 | 10/1982 | Nyberg et al. | 370/111 |
| 4,377,860 | 3/1983 | Godbole | 370/111 |
| 4,476,559 | 10/1984 | Brolin et al. | 370/110.1 |
| 4,581,746 | 5/1986 | Arnold | 370/110.1 |
| 4,730,312 | 3/1988 | Johnson et al. | 370/110.1 |
| 4,750,173 | 6/1988 | Blüthgen | 370/111 |
| 4,901,344 | 2/1990 | Monette et al. | 370/110.1 |

*Primary Examiner*—Douglas W. Olms
*Assistant Examiner*—H. Kizou
*Attorney, Agent, or Firm*—Leroy Eason

[57] ABSTRACT

A system for transmitting digitized analog information includes, for the purpose of transmitting an additional information signal apparatus for modifying the bit of low significance of every n-th data word representing the digitized information depending on the bits of an additional information signal. The apparatus for modifying is constructed in such a way that the modification depends both on the additional information signal and on other bits such as the most significant bit b7 of the data word which are not correlated with the bits of the additional information signal. This results in the intercorrelation between the errors in the data words introduced by the modification being reduced, so that a flatter power density error spectrum is obtained and the errors introduced in the data words by the modification are less conspicuous. A system for recovering the additional information signal from received modified data words includes similar apparatus for reversing the modification.

9 Claims, 6 Drawing Sheets

| b0 | b7 | d | b0* | Δ |
|---|---|---|---|---|
| 0 | 0 | 0 | 0 | 0 |
| 1 | 0 | 0 | 0 | -1 |
| 0 | 1 | 0 | 1 | +1 |
| 1 | 1 | 0 | 1 | 0 |
| 0 | 0 | 1 | 1 | +1 |
| 1 | 0 | 1 | 1 | 0 |
| 0 | 1 | 1 | 0 | 0 |
| 1 | 1 | 1 | 0 | -1 |

$b0^* = b7 \oplus d$

DEVICE FOR TRANSMITTING DATA WORDS REPRESENTING A DIGITALIZED ANALOG SIGNAL AND DEVICE FOR RECEIVING THE TRANSMITTED DATA WORDS

This is a continuation of application Ser. No. 07/327,197, filed Mar. 22, 1989 now abandoned.

BACKGROUND OF THE INVENTION

1. Field of the Invention

The invention relates to a device for transmitting a series of data words representing a digitized analog signal, which device comprises modifying means constructed to modify the series of data words, prior to transmission, in dependence upon an additional information signal in such a way that after modification the additional information signal is represented by bits of low significant of the selected data words, the values represented by the modified data words being substantially equal to the values represented by the relevant data word prior to modification.

The invention further relates to a device for receiving data words for use in conjunction with such a transmitting device, which receiving device comprises means for recovering the additional information signal from said bits of low significant of selected received data words.

2. Description of the Prior Art

Such devices are known from the European Patent Application EP-A-0,205,200.

EP-A-0,205,200 corresponding to U.S. Pat. No. 4,750,173 issued Jun. 7, 1988 and assigned to the same assignee as this application. Therein is described a transmission system in which, said application describes a transmission system in which for the transmission of the additional information signal, one or more of the least significant bits of every n-th signal sample of a series of digitized audio signal samples is or are replaced by bits of the additional information signal. After the series of signal samples thus modified has been transmitted the additional information signal is recovered from the signal samples, the original audio signal being recovered from the signal samples by digital-to-analog conversion.

The substitution of the least significant bits in every n-th signal sample introduces a minor error in the signal values. If the logic value of the additional information signal remains constant for a longer time repetition patterns may arise in the errors, resulting in audible whistle tones in the recovered audio signal. This is caused by the fact that the errors are intercorrelated if the additional information signals do not vary significantly.

In the known method the occurence of annoying whistle tones is precluded in that, after recovery of the additional information signal, the signal sample bits used for the transmission of the additional information signal are replaced by a bit of an arbitrary logic value, which substantially reduces the correlation in the consecutive errors. However, this known method has the drawback that additional circuits are needed in the signal processing path where the received signal samples are converted into the original audio signal. This is undesirable, in particular if the number of receiving devices is substantially larger than the number of transmitting devices, as for example in the case that the information is transmitted via a record carrier, such as for example a magnetic tape or an optically readable disc.

SUMMARY OF THE INVENTION

It is the object of the invention to provide means which enable information to be transmitted by means of a device as defined in the opening paragraph, in such a way that the correlation in the consecutive errors is reduced without additional circuits being needed in the signal processing path of the signal samples at the reception side.

This object is achieved by a device which is characterized in that the modifying means are adapted to modify the selected data words depending both on the additional information signal and on the logic values of other bits than the less significant bits, which other bits are substantially non-correlated with the additional information signal.

The invention is based on the recognition of the fact that the error intercorrelations can be reduced by modifying the selected data words depending upon both the additional information signal and a bit series which is non-correlated with the information signal.

An embodiment of the transmitting device is characterized in that the device comprises a binary wide-noise generator for generating said other bits.

Another embodiment of the transmitting device is characterized in that said other bits are bits of the data words.

This embodiment advantageously utilizes the fact that the bits of the data words are not correlated with the bits of the additional information signal.

Another embodiment of the transmitting device is characterized in that the modifying means comprise means for changing the values represented by the selected data words in such a way that after the change the n least significant bits of each of the relevant data words corresponds to the logic value of n bits of the information signal and means for determining the signs of the changes depending upon the logic values of said other bits.

This embodiment has the advantage that upon reception of the additional information signal can be recovered directly from said less significant bits.

A further embodiment is characterized in that the modification value and n are both equal to one.

In comparison with an embodiment employing more than one bit of the selected data words the last-mentioned embodiment has the advantage that the error energy in the analog signal represented by the data words for every transmitted bit of the additional information signal is low.

An embodiment which is attractive on account of its simplicity is characterized in that the modifying means are adapted to subject bits of the additional information signal and said other bits of the data words to an Exclusive-OR operation in order to determine the logic values of said less significant bits.

A receiving device for use in conjunction with the last-mentioned embodiment of the transmitting device is characterized in that the signal recovery means comprise means which are constructed to perform an Exclusive-OR operation for said least significant bits and the specific other bits of the data words in order to determine the logic values of the additional information signal.

This combination of a transmitting and receiving device advantageously uses the face that a logic "Exclusive-OR" operation is reversible.

Further embodiments of the transmitting device and the receiving device and their advantages will now be described in more detail, by way of example, with reference to FIGS. 1 to 11, of which:

DETAILED DESCRIPTION OF THE PREFERRED EMBODIMENTS

Figures 1, 2:
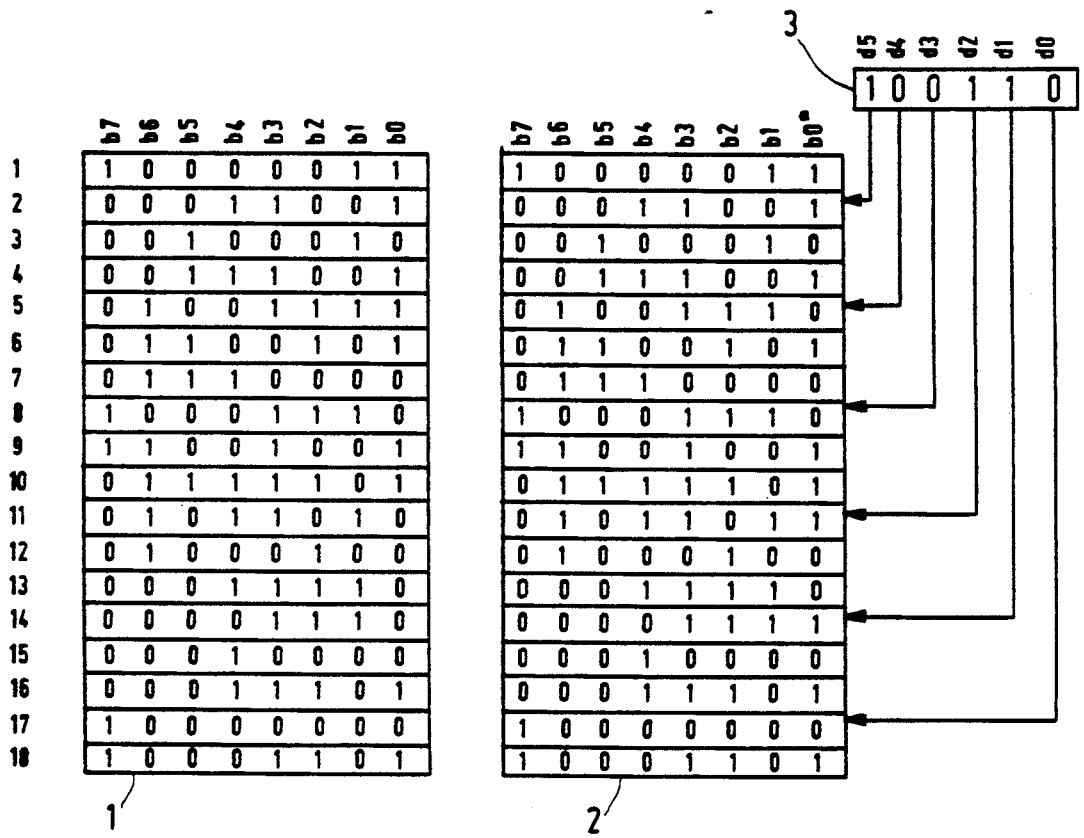
FIGS. 1 and 2 serve to illustrate prior-art methods of transmitting an additional information signal.

FIG. 1 shows a series 1 of 8-bit data words, representing a series of digitized signal samples of an analog signal, for example an audio or a video signal. The reference numeral 2 indicates a series of data words derived from the series 1 by replacing the least significant bit b0 of every nth, for example n=3 data word (in FIG. 1 these are the least significant bits of the $2^{nd}$, $5^{th}$, $8^{th}$, $11^{th}$, $14^{th}$ and $17^{th}$ data word) by a bit of an additional information signal comprising a series 3 of bits d5, ..., d0.

The series 2 of modified data words can subsequently be transmitted via a customary data transmission channel or a record carrier. After transmission the additional information signal can be recovered by detecting the least significant bits of every $n^{th}$ data word received. The analog signal represented by the data word can be recovered from the series of data words by customary digital-to-analog conversion techniques. This method of transmitting additional information along with the digitized analog information is frequently referred to as "bit stealing".

Transmitting additional information by means of bit stealing has the advantage that the data format used for the transmission need not be modified.

Since for the transmission of the additional information only the least significant bits of the data words are used, the error introduced in the recovered analog signal as a result of bit stealing is minimal. FIG. 2 by way of illustration gives the magnitude of the error $\Delta$ as a function of the logic value of the least significant bit b0 of the original data word and the logic value of the bit d of the additional information. The bit b0* is substituted for b0, and is the same as bit d.

If the additional information varies only to a small extend repetition patterns may arise in the errors $\Delta$, which in the case that the analog signal is an audio signal result in audible whistle tones and in the case that the analog signal is a video signal result in a visible interference pattern in the video picture. This is caused by the fact that the errors $\Delta$ are intercorrelated and the spectral power density distribution of the error signal consequently exhibits peaks.

In the embodiments to be described hereinafter steps have been taken to reduce the intercorrelation between the errors, which results in a flatter spectral power density distribution and hence in less conspicuous errors in the audio or the video signal.

Figure 3:
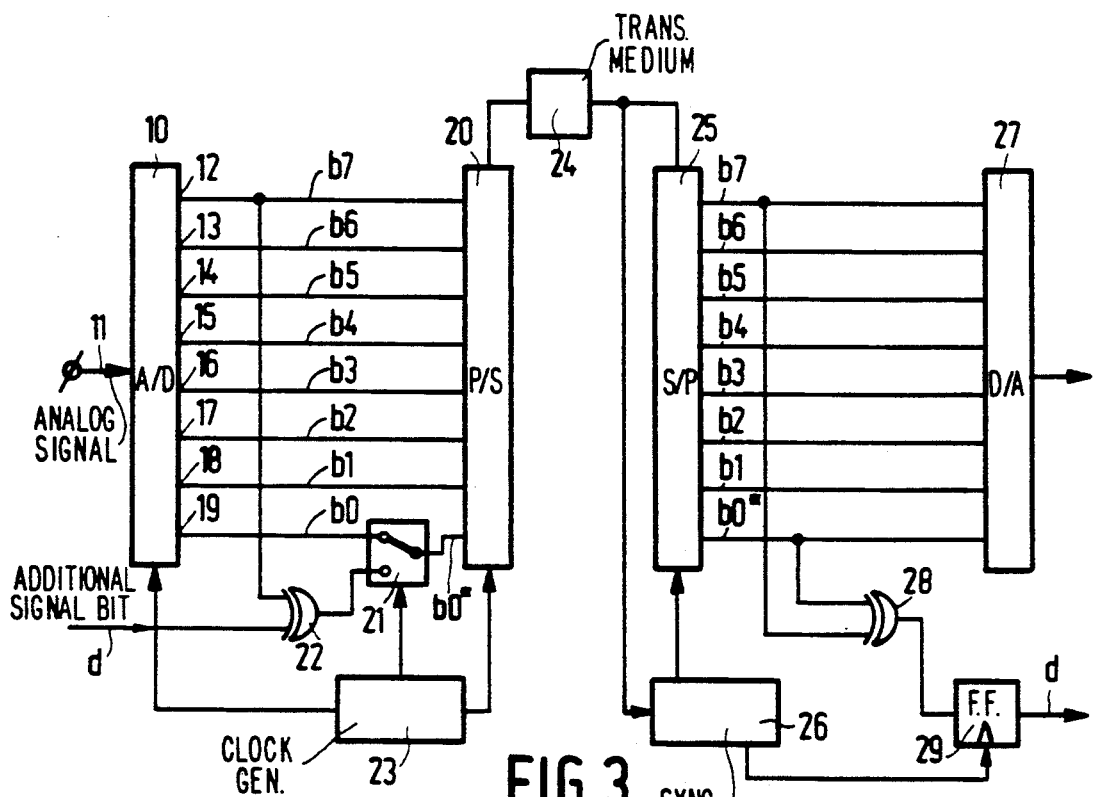
FIGS. 3, 6, 9 and 11 show transmission systems utilizing different embodiments of the transmitting device and of the receiving device in accordance with the invention.

FIG. 3 shows an information transmission system employing a first embodiment of a transmitting device and a receiving device in accordance with the invention. The reference numeral 10 denotes an analog-to-digital converter by means of which an analog signal, for example an audio or a video signal, applied via an input 11 is converted into data words, for example 8-bit data words. The individual bits of the data words are referred to as b7, ... b0, where b7 is the most significant bits and b0 is the least significant bit.

The bits b7, ... , b0 are fed out via the respective outputs 12, ... , 19. The output signals on the outputs 12, ... , 18, which represent the seven most significant bits, are applied directly to the parallel inputs of a signal processing circuit 20. The output signal on the output 19, which signal represents the least significant bit b0, is applied to the signal processing circuit 20 via a two-channel multiplex circuit 21.

The processing circuit 20 in a customary manner converts the data words which are applied in parallel from into a serial bit stream, synchronization signals being inserted into the bits stream for the purpose of synchronizing the information transmission.

The processing circuit 20 may comprise for example known circuits as used for recording standard CD signals or standard DAT signals.

The bits d of the additional information signal are applied to an input of an Exclusive-OR gate 22. The bits b7 of the data words generated by the analog-to-digital converter 10 are applied to the other input of the Exclusive-OR gate 22. The output signal of the Exclusive-OR gate is applied to the signal processing circuit 20 via the multiplex circuit 21. By means of a clock signal generator 23 the signal processing circuit 20, the analog-to-digital converter 10 and the multiplex circuit 2 are controlled in such a way that upon every $n^{th}$ data word generated by the analog-to-digital converter the output signal of the Exclusive-OR gate 22 is applied to the signal processing circuit 20, the least significant bit b0 of the other data words being applied to the signal processing circuit 20.

Thus, the least significant bit of every $n^{th}$ data word is replaced by a bit having a logic value derived from a bit d of the additional informational signal or word and one of the bits of the data word, in the present case the most significant bit b7, by means of an Exclusive-OR operation having a logic value dependent upon whether compared logic values of bit d and bit b7 are the same or different.

Figures 4, 5:
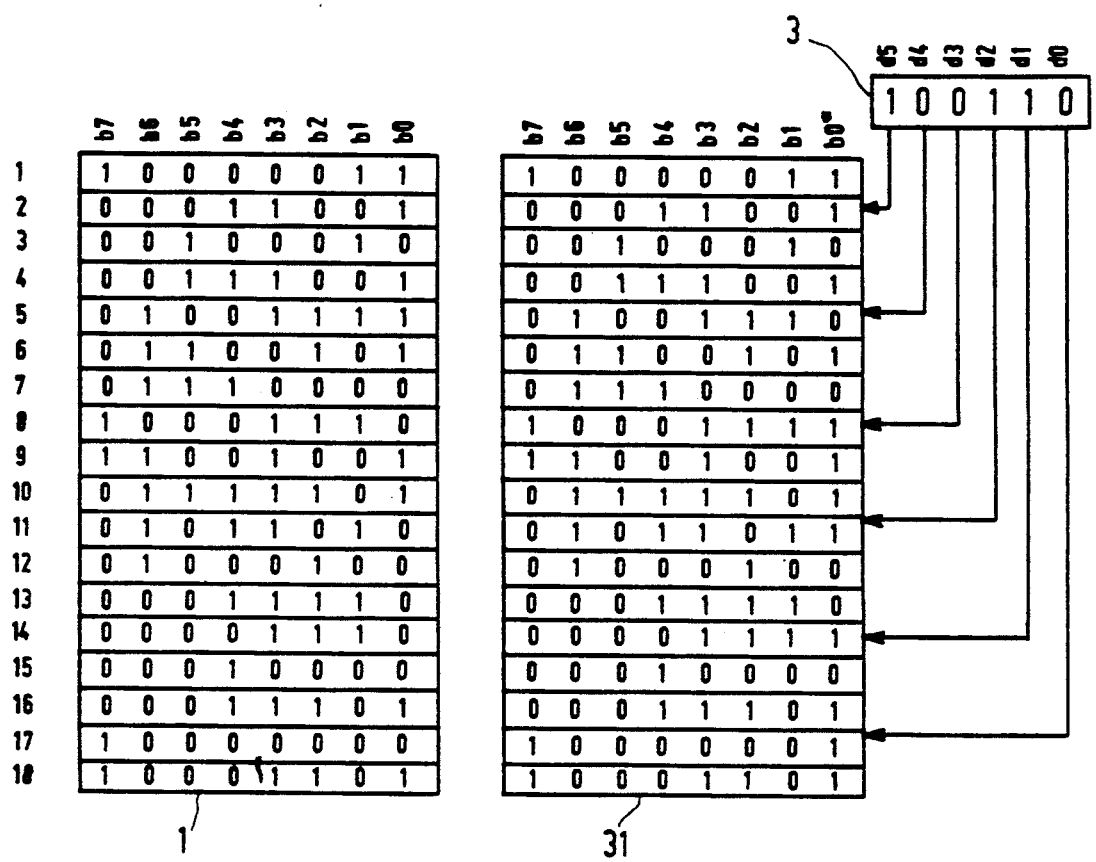
FIGS. 4, 7 and 10 illustrate the data-words modification dependent upon the additional information signal for different embodiments of the transmitting device in accordance with the invention.
FIGS. 5 and 8 illustrate the relationship between the prevailing error and the logic values of bits of the data word and the additional information word for different embodiments of a transmitting device in accordance with the invention.

By way of illustration FIG. 4 shows a series 31 of data words in which the least significant bit of every $3^{rd}$ data word is replaced by a bit b0* depending upon the most significant bit b7 and one bit d of the additional information word by means of the circuit described above.

FIG. 5 gives the error $\Delta$, introduced in the data words as a result of the bit stealing method illustrated in FIG. 4, as a function of the most significant bit b7, of the least significant bit b0 and of the data bit d. The error $\Delta$ is a function of three substantially uncorrelated bits b0, b7 and d. The intercorrelation between the errors $\Delta$ will therefore be reduced in comparison with the known bit stealing method as illustrated in FIGS. 1 and 2, in which the error $\Delta$ depends only on the bits b0 and d.

After transmission, the bits d of the additional information signal can be recovered simply by means of subjecting the least significant bits b0* and the most significant bits b7 of every $n^{th}$ data word received to the Exclusive-OR operation.

FIG. 3 also shows the circuit for recovering the additional information signal. In the circuit the bit series transmitted via a transmission medium 24 which, for example may be a transmission channel, a DAT cassette tape or an optical storage disc is applied to a second processing circuit 25 and a synchronizing circuit 26. The synchronizing circuit, in a manner known per se, detects the synchronizing signals in the received bit stream to derive clock signals for controlling the processing circuit 25, which recovers in parallel the bits of the data words from the serial bit stream. The bits b7, ..., b1 and b0* are applied to a digital-to-analog converter 27, which reconverts the data words into an analog signal. The bits b7 and b0* are not only applied to the digital-to-analog converter 27 but also to an Exclusive-OR gate 28. The output signal of the Exclusive-OR gate 28 is applied to the input of a flip-flop 29, which is controlled by the synchronizing circuit 26 in such a way that upon reception of every $n^{th}$ data word the flip-flop 29 is loaded with the result of the logic operation performed by the Exclusive-OR gate 28, so that the additional information signal becomes available on the output of the flip-flop 29.

For the transmission of the additional information signal the circuit shown in FIG. 3 the subjects the most significant bit b7 and the additional information bits d to the logic Exclusive-OR operation. However, this logic operation may also be applied to one of the bits b6, ..., b1 or a logical combination thereof and the bits d. It is essential only that the bits of the data word used in the logical operation are uncorrelated with the bits d of the additional information signal. Neither is it necessary that the logic operation is performed with a bit of those data words in which the least significant bits are modified. It is also possible to use bits of other data words for this purpose.

In the circuit shown in FIG. 3 the data words are converted into a series of serial bits. However, it will be evident that, although this is common practice in information transmission, it is not necessary to convert the data words into serial form but that the information may also be transmitted in parallel form.

In the circuit shown in FIG. 3 only one bit of every $n^{th}$ data word is replaced. However, it is equally possible to replace more than one bit in every $n^{th}$ data word.

Figure 6:
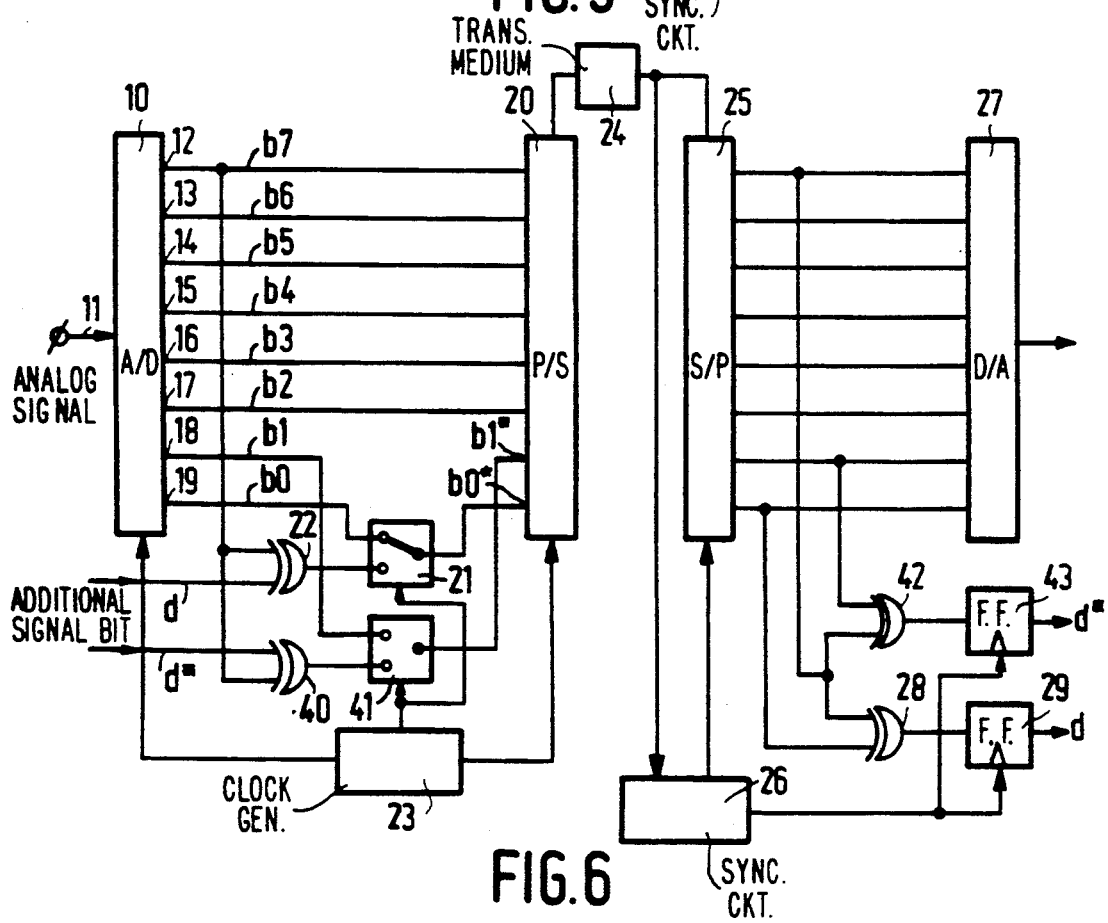

FIG. 6 shows an embodiment in which instead of one bit two bits of every selected data word are replaced. In FIG. 6 elements corresponding to those in the embodiment shown in FIG. 3 bear the same reference numerals. In addition to the Exclusive-OR gate 22 and the multiplexer 21 for replacing the least significant bit b0, the embodiment of FIG. 6 also comprises an Exclusive-OR gate 40 and a multiplex circuit 41 by means of which the next to the least significant bit b1 of every $n^{th}$ data word is replaced in a similar way. At the receiving side an additional Exclusive-OR gate 42 and an additional flip-flop 43 are provided for recovering the bits d of the information signal. Upon reception of every $n^{th}$ data word, two bits of the additional information signal are recovered by means of the Exclusive-OR gates 28 and 42 and the associated flip-flops 29 and 43.

Figure 7:
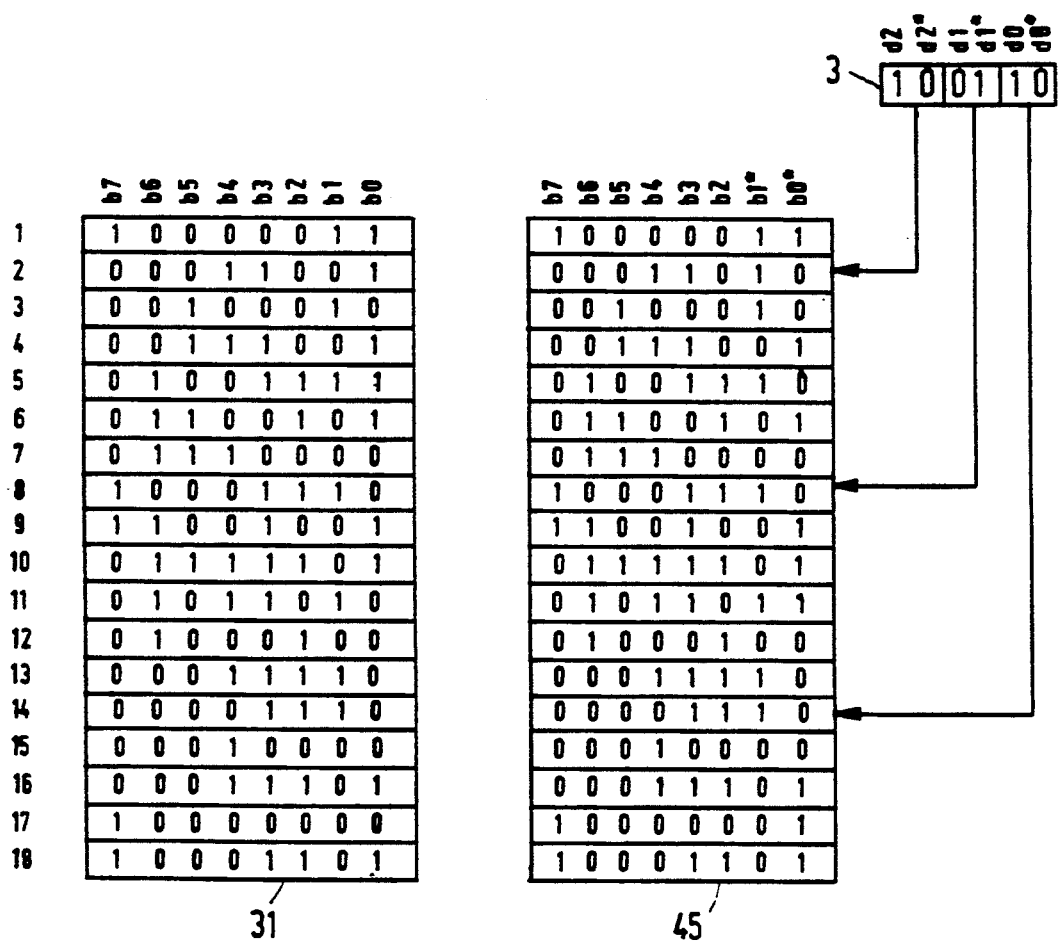

By way of illustration FIG. 7 shows the series 1 of data words which, depending upon a series of two bits of the information signal, can be converted by means of the circuit shown in FIG. 6 into a series 45 in which the two least significant bits of every $6^{th}$ data word have been replaced.

Figures 8, 9:
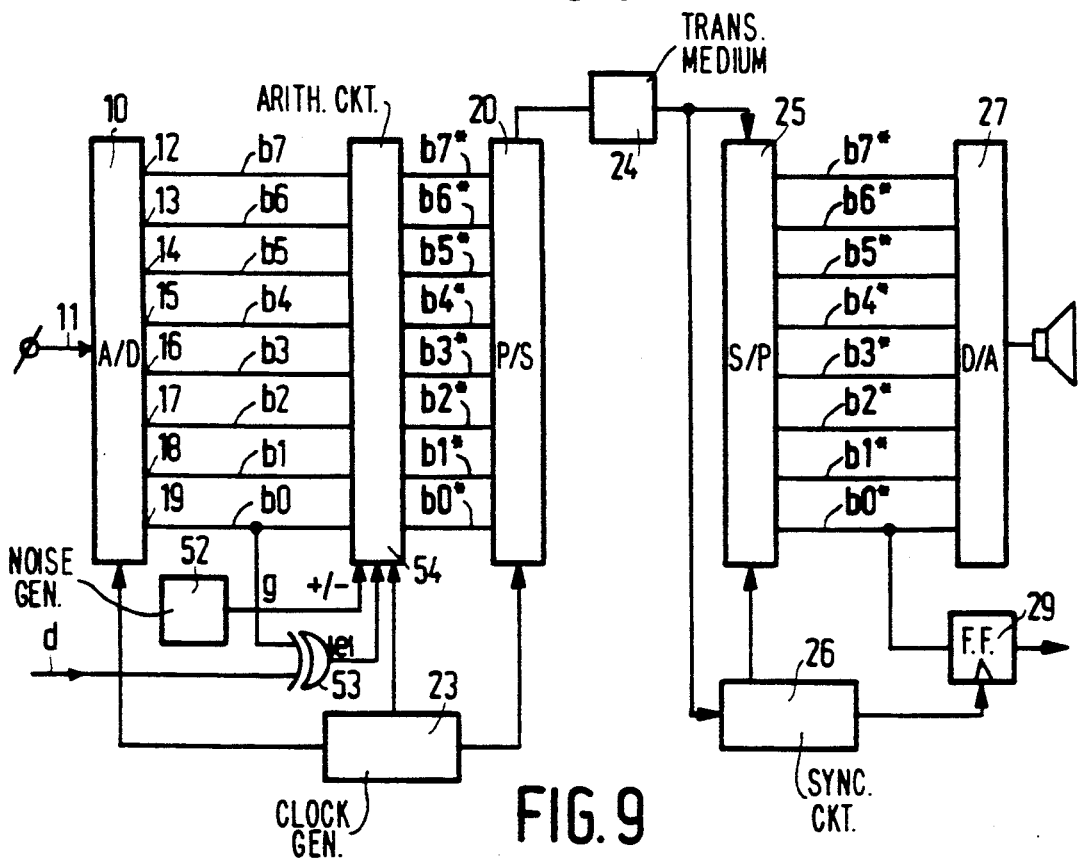

FIG. 9 shows an embodiment of a transmission system employing yet another transmitting device in accordance with the invention. In FIG. 9 elements corresponding to those in FIG. 3 bear the same reference numerals.

In the present embodiment every $n^{th}$ data word of the series 1 of data words is incremented or decremented by such a modification value that the least significant bit of the modified data word corresponds to the logic value of one bit of the additional information signal to be transmitted.

Before the circuit shown in FIG. 9 is described in detail the underlying bit stealing method will be described with reference to FIG. 10.

Figure 10:
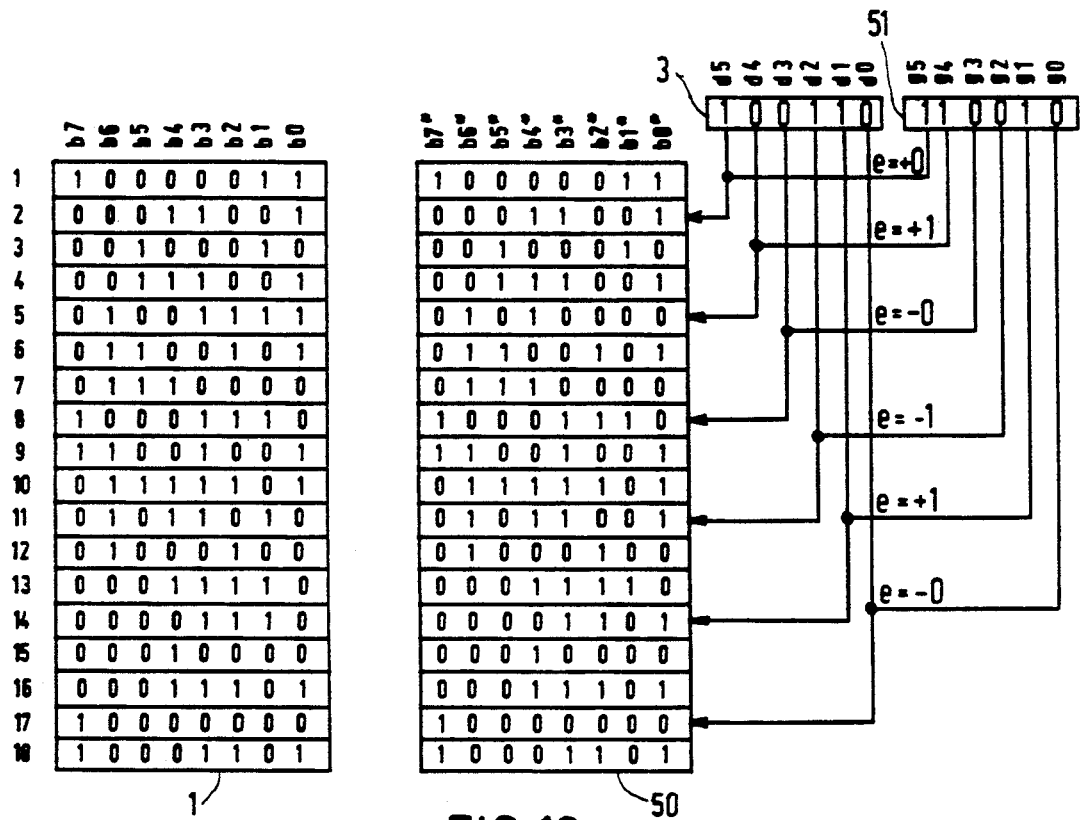

FIG. 10 the series of data words generated by the analog-to-digital converter 10 again bears the reference numeral 1 and the series of bits d of the additional information signal again bears the reference numeral 3. The reference numeral 50 denotes the series of data words in which every third data word is changed by a modification value e. The modification value e is derived from the least significant bit b0 in data words to be modified and the bit d of the additional information word to be transmitted, in such a way that after modification the logic value of the least significant bit corresponds to the logic value of the bit d to be transmitted. If, as is the case for the second, the eighth and the seventeenth data word of the series 1, the logic value of the least significant bit b0 and the logic value of the bit d to be transmitted are equal the data word need not be modified, i.e. the modification value 2 is zero. If, as is the case for the fifth, the eleventh and the fourteenth data word of the series 1, the logic value of the least significant bit b0 and the bits d do not correspond, a modified data word whose least significant bit b0* corresponds to the bit d can be obtained by incrementing or decrementing the data word by the value one. In order to minimize the intercorrelation between the consecutive values e, i.e. the errors introduced by bit stealing, an arbitrary sign is selected for the modification.

FIG. 10 this sign is determined by a series 51 of bits g of arbitrary logic value.

In the transmission system shown in FIG. 9 the series 51 is generated by means of a binary random-noise generator 52 of a customary type, the absolute value of e being derived from the bits d of the additional information signal and the least significant bits b0 of the data words by means of an Exclusive-OR gate 53. For modifying the data words an arithmetic circuit 54 of a customary type is arranged between the analog-to-digital converter 10 and the processing circuit 20, which arithmetic circuit is controlled in dependence on the output signal of binary noise generator 52, the output signal of the Exclusive-OR gate 53 and the clock signal on the output of generator 23, in such a way that every $n^{th}$ data word is incremented or decremented by the value indicated by the output signal $|e|$ of the Exclusive-OR gate 53, depending on the output signal of the binary noise generator 52.

This yields a series of data words in which the least significant bit of every $n^{th}$ data word corresponds to a bit of the additional information signal.

At the receiving side the bits d of the additional information signal can be detected simply be means of the flip-flop 29 which is controlled by the synchronizing circuit 26, the least significant bit b0* being applied directly to the data input of the flip-flop.

In the embodiment shown in FIG. 9 the sign of the modification is determined by means of the binary noise generator 52. Since the data word bits b0, . . . , b7 are non-correlated with the bits d of the additional information signal these bits can also be used for determining the sign of the modification, which yields a very simple embodiment of the receiver.

Further, the embodiment shown in FIG. 9 only employs the least significant bit of every $n^{th}$ data word for the transmission of the additional information signal. However, it is alternatively possible to use two or more bits of the data word for this purpose. FIG. 8 by way of example illustrates the relationship between the modification value e, the arbitrary bit g, the two least significant bits b1, b0 and two bits d, d* of the additional information signal.

FIG. 8 shows that for specific combinations of b1, b0 and d, d*, for example b1, b0, d, d*=(0, 0, 0, 1), the sign of the modification is independent of g. For said combination b, b0, d d*=(0, 0, 0, 1) the modification values always +1. However, for a number of other combinations, namely: b1, b0, d, d*=(0010), (0111), (1000), and (1101) the sign may be selected freely. For these combinations the data words with the bits b1* and b0*, whose logic values correspond to those of the data bits d, d* can be obtained by a modification by +2 or by −2. If the sign of the modification is now made dependent on the bits g of arbitrary logic values the intercorrelation between the successive errors, i.e., the value of e, can be reduced.

Figure 11:
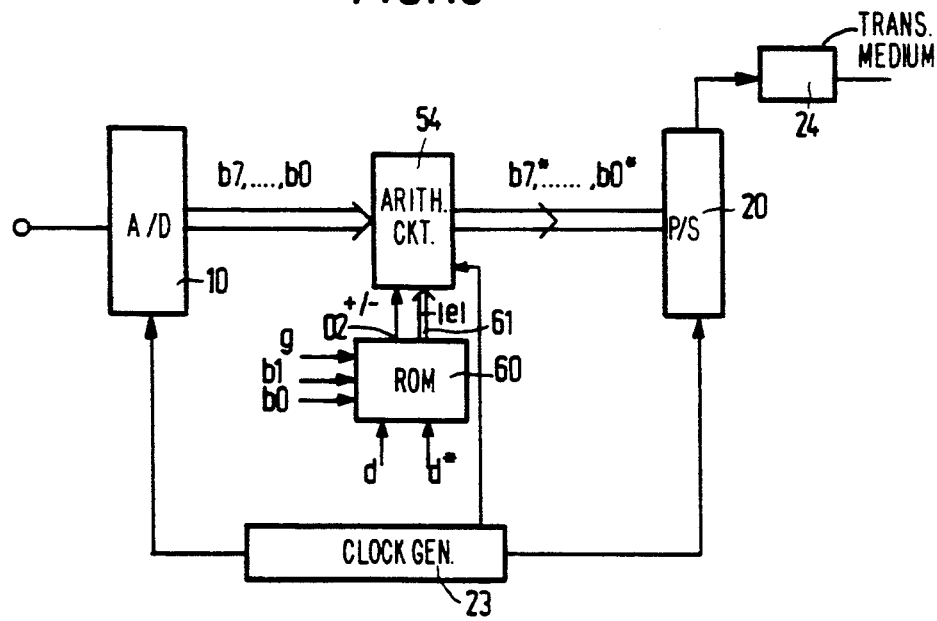

FIG. 11 shows a variant of the circuit shown in FIG. 9 by means of which the data words are incremented or decremented in accordance with the last-mentioned modification method. The Exclusive-OR gate 53 is replaced by a circuit 60, which derives the absolute magnitude of the modification value e and the sign of the modification from the bits g of the arbitrary series, the two least significant bits b1, b0 of the data word, and the bits d, d* of the additional information signal. The absolute magnitude of the modifications value and the sign of the modification are transferred to the arithmatic circuit 54 via a bus 61 and a signal line 62 respectively. The circuit 60 may comprise a read-only memory (ROM) or a gate circuit which defines the relationship illustrated in FIG. 8.

In the last-mentioned method in the rate situation in which the original data words already have the maximum positive or maximum negative value a relative overflow situation may arise. If desired, this can be precluded by detecting data words of maximum positive or maximum negative value and subsequently, depending on the sign, decrementing instead of incrementing, or incrementing instead of decrementing.

We claim:

1. A device for transmitting a series of data words representing digitized signal samples, each data word having a plurality of bits of respective orders of significance, said device comprises means for modifying selected data words in said series prior to transmission by replacing one or more least significant bits of each selected data word with substitute bits derived in accordance with an additional digital information signal, so that such signal is represented by the substitute bits of the transmitted modified data words; the least significant bits of a selected data word being bits thereof of lesser significance than the remaining unreplaced bits thereof; characterized in that said modifying means comprises:

means for producing a series of other bits which are substantially non-correlated with said additional information signal; and means for deriving the substitute bits of each selected data word in accordance with logical combinations of respective bits of the additional information signal and one or more of said series of other substantially non-correlated bits.

2. A transmission device as claimed in claim 1, further comprising a binary random-noise generator for generating said other bits.

3. A transmission device as claimed in claim 1, wherein said other bits are one or more of said remaining unreplaced bits of the selected data words.

4. A transmission device as claimed in claim 1, wherein said modifying means comprises:

means for selectively incrementing or decrementing each selected data word by a modification value such that a plurality (N) of least significant bits thereof are replaced with substitute bits derived in accordance with the logic values of (N) bits of said additional information signal and;

means for determining whether a selected data word is to be incremented or decremented, such determination being made in accordance with the logic values of those of said other bits which are used for deriving said substitute bits;

whereby said substitute bits respectively correspond to logical combinations of respective bits of the additional information signal with respective ones of said other bits.

5. A transmission device as claimed in claim 4, wherein said modification value and n are each equal to "1".

6. A transmission device as claimed in claim 3, wherein said modifying means is adapted to compare a respective bit of the additional information signal with one or more of said remaining bits of a respective selected data word, the result of each such comparison constituting a substitute bit of the modified data word corresponding to such selected data word.

7. A transmission device as claimed in claim 6, wherein said modifying means is adapted to replace the least significant bit of each selected data word with a substitute bit derived in accordance with a logical comparison of a bit of the additional information signal with one of said remaining bits of such selected data word.

8. A device for receiving a series of transmitted data words certain of which are modifications of selected one of a series of data words representing digitized signal samples, one or more least significant bits of each selected data word having been replaced prior to transmission with substitute bits derived in accordance with a reversible combinatorial logic operation performed on respective bits of an additional digital information signal and one or more other bits which are substantially non-correlated with said additional signal, such other bits being remaining unreplaced bits of said selected data word; said receiving device comprising:

means for separating from a received modified data word the substitute bits thereof and those of the remaining bits of such modified data word which are unreplaced bits of a data word from which such modified data word was derived prior to being transmitted; and means for again performing said combinatorial logic operation on the so separated substitute bits and remaining bits of said modified data word, so as to reverse the logic operation by which such modified data word was derived prior to transmission and thereby recover one or more bits of said additional information signal.

9. A receiving device as claimed in claim 8, wherein said reversible combinatorial logic operation for deriving substitutes for least significant bits of a selected data word includes comparison of the logic values of one or more of the remaining bits of such data word with the logic values of one or more bits of the additional information signal, and said means for again performing said combinatorial logic operation on a received modified data word comprises means for comparing the logic values of the substitute bits of such modified data word with the logic values of bits thereof which are remaining unreplaced bits of the corresponding transmitted data word.

* * * * *